United States Patent [19]

Peter

[11] Patent Number: 4,876,297

[45] Date of Patent: Oct. 24, 1989

[54] METHOD OF PRODUCING MIXTURES OF RUBBER OR RUBBER-LIKE MATERIAL, AND CARBON BLACK

[76] Inventor: Julius Peter, Tiergartenstr. 107, D-3000 Hannover 71, Fed. Rep. of Germany

[21] Appl. No.: 219,459

[22] Filed: Jul. 15, 1988

[30] Foreign Application Priority Data

Jul. 16, 1987 [DE] Fed. Rep. of Germany ....... 3723533

[51] Int. Cl.$^4$ .......................... C08L 21/22; C08K 3/04; C08J 3/20
[52] U.S. Cl. .................................... 523/351; 523/137; 523/300; 523/344; 524/496
[58] Field of Search ............... 523/137, 351, 300, 344; 524/496

[56] References Cited

U.S. PATENT DOCUMENTS

| | | | |
|---|---|---|---|
| 4,417,005 | 11/1983 | Tokieda et al. ..................... | 523/351 |
| 4,451,595 | 5/1984 | Lee ...................................... | 523/351 |
| 4,661,299 | 4/1987 | Thorsrud ............................ | 523/137 |
| 4,705,819 | 11/1987 | Scriver ................................ | 523/351 |

FOREIGN PATENT DOCUMENTS 0883080  11/1981  U.S.S.R. .............................. 523/351

*Primary Examiner*—Herbert J. Lilling
*Attorney, Agent, or Firm*—Becker & Becker, Inc.

[57] ABSTRACT

A method of producing a mixture that contains rubber or rubber-like material, and carbon black. The method includes the steps of adding to the rubber or rubber-like material a portion only of the intended total quantity of carbon black, thereupon preheating the above in a high-frequency alternating field, and subsequently adding in the remainder of the intended total quantity of carbon black. Expediently, approximately up to a maximum of one-third of the intended total quantity of carbon black is added to the rubber prior to the preheating step.

13 Claims, 1 Drawing Sheet

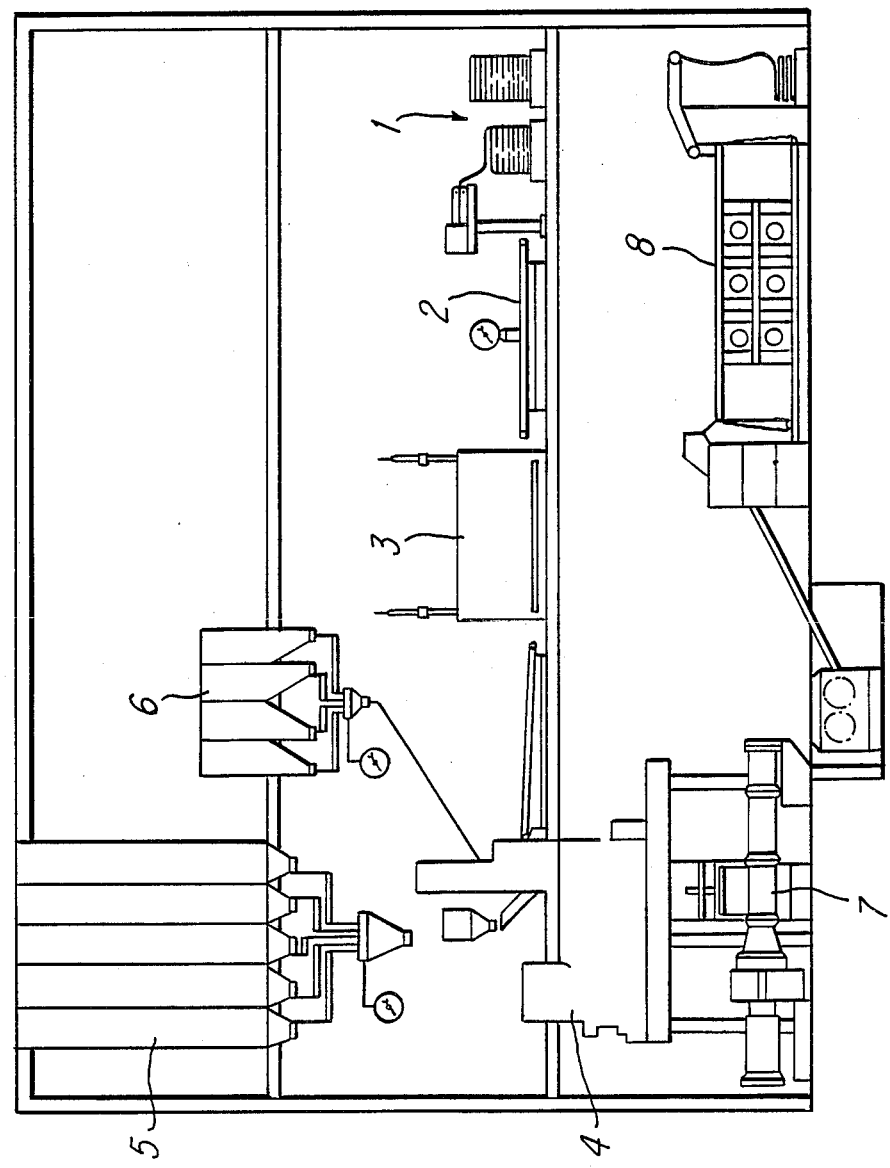

METHOD OF PRODUCING MIXTURES OF RUBBER OR RUBBER-LIKE MATERIAL, AND CARBON BLACK

BACKGROUND OF THE INVENTION

The present invention relates to a method of producing a mixture that contains rubber or rubber-like material, and carbon black, including the step of preheating in a high-frequency alternating field.

Since the preheating of rubber in hot air chambers causes problems, it has already been proposed to preheat rubber in a high-frequency alternating field or zone. However, this type of preheating could not be accepted in practice because most types of rubber have a dielectric dissipaion factor that is too low.

Furthermore, at the beginning of a mixing procedure, different time spans are needed for plasticizing and decrystallization as a function of the temperature at which the rubber is introduced into the kneader. In addition, the local nonuniformity of the heating-up of cold rubber balls also facilitates the creation of rubber portions that are overfilled with highly active fillers and that experience has shown can be distributed in the other matrix only with great difficulty, if at all. Furthermore, the time until energy absorption, i.e. the time up to the actual mixing process, is a function of the viscosity and the hardness of the balls that are supplied. This also leads to nonuniformity during the production of the mixture. These problems are particularly prevalent with paddle kneaders having intermeshing paddles; furthermore, these kneaders are more difficult to charge due to their construction.

The present invention furthermore proceeds from the recognition that due to the difficulties connected with the handling of carbon black, it appeared advantageous with emulsion polymers to already add the carbon black in the latex phase in order in this manner to shorten the further mixing time and to preclude the disadvantageous granulation of the carbon black. A similar situation applies to the solution polymers, since in such a situation, due to the low shearing forces, an effective as possible preliminary distribution of the carbon black would result in still greater advantages relative to the mixing. However, the so-called carbon black batch has limitations. This is based, among other things, on the variety of carbon black types, and on the inability to be able to properly screen the carbon black that is used during the fabrication of the rubber products. For these reasons, in practice by far the greatest amount of rubber mixtures are produced without carbon black batch.

It is therefore an object of the present invention to avoid the aforementioned drawbacks. In particular, with the present invention it should be possible during the manufacture of rubber mixtures of various properties, to be able to start to a certain extent from the same mixing conditions, especially from the same starting temperatures, so that consequently, with the existence of a specific batch, it is possible to produce therefrom, for example, all current tread mixtures for vehicle tires, or all adhesive mixtures for the construction of automobile tires. Another object of the present invention is to reduce the overall mixing time.

BRIEF DESCRIPTION OF THE DRAWING

These and other objects and advantages of the present invention will appear more clearly from the following specification in conjunction with the accompanying schematic drawing, which illustrates one exemplary embodiment of a manufacturing arrangement for practicing the inventive method of mixing rubber or the like.

SUMMARY OF THE INVENTION

The method of the present invention is characterized primarily in that only a portion of the intended total quantity of carbon black is added to the rubber or rubber-like material prior to the processing in the alternating field, with the remainder of the intended total quantity of carbon black being added after the preheating. Expediently, only approximately a third of the intended total quantity of carbon black is initially added, with this quantity of carbon black preferably being of the order of magnitude of approximately 5 to 15% based upon 100 parts rubber.

Understandably, during the preheating the vulcanization temperature should not be reached. Rather, generally a preheating to approximately 40°-60° C. is provided. It is furthermore important that such a preheating not be undertaken in a pulse-like manner, but rather be extended or spread over a time span that is determined by the mixing cycle. Accordingly, the preheating time can extend over several minutes, for example approximately 3 to 6 minutes. Therefore, a low percentage of carbon black suffices to assure an adequate dielectric dissipation. The inventive teaching of preceding the high-frequency preheating by first adding a relatively small amount of carbon black, and of carrying out the preheating over several minutes, amplifies the previously customary mixing process without having to appreciably change this process with regard to time or capital outlay. In this connection, it should be noted that the outlay for a suitable preheating unit is reasonable in relation to the outlay for a mixing unit.

Starting, for example, from a measured carbon black quantity of 5 to 15 parts N 339 with SBR or OESBR, it is possible, under the assumption that a BR/carbon black batch of similar composition is also available, to produce in a simple manner practically all current passenger car tread surfaces for pneumatic tires from a single type of carbon black batch. Furthermore, from a natural rubber/carbon black batch of comparable composition, practically all pneumatic truck tire rubber mixtures as well as all steel wire adhesion mixtures can be produced. With EPDM, there also results the advantage that due to the present invention the stability of the polymer in light can be improved; this is a problem that occurs frequently in present practice.

In order to be able to economically carry out the high-frequency preheating of a low filled carbon black batch, and to be able to appropriately implement the respective requirements, it is expedient, prior to the processing in the alternating field, to determine the weight, the temperature, and the shape of the body that is to be processed, so that as a function of these values, a precise preheating can be carried out at a reproducible temperature. In this connection, it is particularly expedient, for determining the shape of the rubber member that is to be processed, to use one or more radiation sources, for example an infrared emitter, with which sensors must be associated that respond to this radiation. In this way it is possible, for example, to determine the contours; the so-called shape factor can then be incorporated into the calculation of a favorable high-frequency preheating. Such a device can also be used to determine the weight and/or the temperature.

In the context of the present application, mixtures of rubber or the like include all mixtures that predominantly comprise rubber or rubber-like material, as well as further additives; these mixtures must, however, of course contain the carbon black that is necessary for the highfrequency preheating.

The operations that follow the aforementioned preheating, and that provide for completion of the mixing, can be of any type. In this connection, in particular the proven so-called internal mixer can be used; however, the operating time of the mixer should be a guide for the duration of the ultrahigh frequency preheating. As previously mentioned, in order not to negatively impact the overall mixing process, the preheating should as a maximum be limited to the duration of a main mixing process.

It is particularly advantageous if the further production of the mixture after the preheating in the dielectric field is effected in a single-stage process. However, it is also possible to use a tandem mixing process where the material that is to be mixed is conveyed from a base mixer, which is embodied as a floating weight kneader, without intermediate storage to the final mixer, which is embodied as a kneader that does not have a floating weight. Both mixers preferably utilize kneaders that have cooperating and preferably intermeshing rotors that are driven in opposite directions.

It is furthermore advantageous pursuant to the present invention if with emulsion polymers and natural rubber, the first or initial carbon black quantity be added in the latex phase, and with solution polymers the initial carbon black quantity be added in the solution phase.

Further specific features of the present invention will be described in detail subsequently.

DESCRIPTION OF PREFERRED EMBODIMENTS

Referring now to the drawing in detail, from the stock supply 1, with the carbon black batch in ball form or in the form of sheets, the rubber passes onto a scale 2 at a room temperature of 10° to 25° C. A measured quantity of the rubber is then heated or warmed up in the UHF (ultra high frequency) preheater 3, and in particular to a temperature of about 40° to 60° C.

Disposed above an internal mixer 4 of known construction are storage bins 5 and 6 for further additives. The storage bin 5 is for carbon black, and the storage bin 6 contains non-reactive additives.

The further processing of the rubber is effected in the internal mixer 4 accompanied by the addition of the additives and carbon black from the storage bins 5, 6. The thus processed mixture passes into a discharge mechanism 7. From there, the rubber passes to the so-called batch-off unit 8. The rubber is also cooled at this location.

It should be noted that the rubber in the stock supply already contains a certain amount of carbon black, and that after the processing in the UHF zone, further carbon black is supplied via the storage bin 5 pursuant to the present invention.

In conjunction with the scale 2, but under certain circumstances even without a scale 2, an infrared device can be used in order to determine the properties of the rubber mixture. This infrared device can have any desired construction.

The following Examples are presented for the processing and composition of the rubber mixture, with "phr" referring to parts by weight per hundred parts rubber.

EXAMPLE 1

A mixture comprising:

| | |
|---|---|
| 100.0 phr | SBR 1712 (copolymer of 77% butadiene and 23% styrene, extended with 37.5 phr highly aromatic mineral oil) |
| 1.0 phr | stearic acid |
| 5.0 phr | zinc oxide |
| 52.0 phr | active carbon black, type N 339 |
| 7.5 phr | aromatic mineral oil |
| 3.5 phr | coumarone resin |
| 1.5 phr | antioxidant IPPD |
| 0.5 phr | antioxidant PBN |
| 1.0 phr | antiozonant wax |
| 1.5 phr | accelerator CBS |
| 1.5 phr | sulfur |
| 174.0 | | was produced pursuant to the above described method in such a way that first the aliquot quantity of a batch comprising 100.0 phr OE-SBR 1712, and 20.0 phr carbon black N 339 that was added to the rubber already in the latex phase during the production, was heated up two and one half minutes in a high frequency field or zone of 3 times 60 kw; the nonreactive materials were subsequently added in the kneader.

The mixing time saved by producing the base mixture pursuant to the present invention amounted to 35% relative to the conventional method.

After the final mixing, the mixtures produced pursuant to the present invention showed no aberrations, neither in their processing characteristics nor in the physical values after vulcanization.

EXAMPLE 2

A mixture, comprising:

| | |
|---|---|
| 100.0 phr | smoked sheets, Mooneyplast. ML-4:65 |
| 2.5 phr | stearic acid |
| 7.5 phr | zinc oxide |
| 50.0 phr | carbon black, type N 220 |
| 5.0 phr | aromatic mineral oil |
| 5.0 phr | coumarone resin |
| 1.5 phr | antioxidant IPPD |
| 0.5 phr | antioxidant PBN |
| 1.0 phr | antiozonant |
| 1.5 phr | accelerator CBS |
| 1.5 phr | sulfur |
| 174.0 | | was produced pursuant to the above described method in such a way that first the aliquot quantity of a carbon black batch comprising 100.0 phr smoked sheets and 10 phr carbon black N 220 was preliminarily mixed in the kneader. Prior to the further processing, this batch was heated up two minutes in a high frequency field of 4 times 60 kw; the non-reactive materials were subsequently mixed into the kneader.

The mixing time saved over the conventional method amounted to a reduction of from four to two and a half minutes.

Again, not only the properties of the untreated mixtures, but also the values of the vulcanized material (after the addition of the reactive materials), were identical.

EXAMPLE 3

A mixture, comprising:

| | |
|---|---|
| 100.0 phr | EPDM rubber (terpolymer comprising 65% ethylene, 30% propylene, and 5% ethylidene norbornen) |
| 1.0 phr | stearic acid |
| 150.0 phr | FEF carbon black, type N 550 |
| 150.0 phr | paraffinic mineral oil |
| 0.5 phr | antioxidant IPPD |
| 3.5 phr | 40% dicumylperoxide |
| 1.5 phr | triallylcyanurate |
| 406.5 | | was produced pursuant to the previously described method in such a way that an aliquot quantity of a carbon black master batch comprising 100.0 phr EDPM rubber, and 50 phr FEF carbon black that was already added during the production in the solution phase of the rubber, was preheated in a high frequency field of 3 times 60 kw for three minutes; the non-reactive materials were subsequently added in the kneader.

The mixture could be produced in a time that was 40% shorter than that possible with the conventional method; again, completely identical properties not only of the untreated mixture but also of the vulcanized material were obtained.

The present invention is, of course, in no way restricted to the specific disclosure of the specification and drawing, but also encompasses any modifications within the scope of the appended claims.

What I claim is:

1. A method of producing a mixture that contains elastomeric material, and carbon black, said method including the steps of:
   adding to said elastomeric material a portion only of the intended total quantity of carbon black;
   thereupon preheating the above in a high-frequency alternating field; and subsequently
   adding-in the remainder of the intended total quantity of carbon black.

2. A method according to claim 1, in which said step of adding carbon black prior to said preheating step comprises adding up to a maximum of approximately one third of the intended total quantity of carbon black.

3. A method according to claim 2, which includes adding approximately 5 to 15% carbon black based on 100 parts elastomer.

4. A method according to claim 1, in which said step of adding carbon black prior to said preheating step comprises adding said carbon black in the latex phase for emulsion polymers and natural rubber.

5. A method according to claim 1, in which said step of adding carbon black prior to said preheating step comprises adding said carbon black in the solution phase for solution polymers.

6. A method according to claim 1, in which said step of preheating said elastomeric material to which carbon black has been added comprises preheating the above to approximately 40° to 60° C.

7. A method according to claim 1, which includes the step of carrying out said preheating for the duration of a mixing cycle that follows said preheating.

8. A method according to claim 7, which includes the step of carrying out said preheating for approximately three to six minutes.

9. A method according to claim 1, which includes the step of carrying out further production of said mixture, after said preheating in said dielectric field, in a single-stage process.

10. A method according to claim 1, which includes the step of carrying out further production of said mixture, after said preheating in said dielectric field, in a tandem mixing process.

11. A method according to claim 1, which includes the step of carrying out further production of said mixture, following said preheating in said high-frequency alternating field, in an internal mixer that has an intermeshing paddle system.

12. A method according to claim 1, which includes the step of effecting said preheating step as a function of weight, shape, and temperature of the material that is to be processed.

13. A method according to claim 12, which includes the step of providing an infrared device to effect determination of said weight, shape, and temperature.

* * * * *